May 12, 1931. F. H. McCALL 1,805,410
FISHING LINE
Filed Nov. 14, 1928
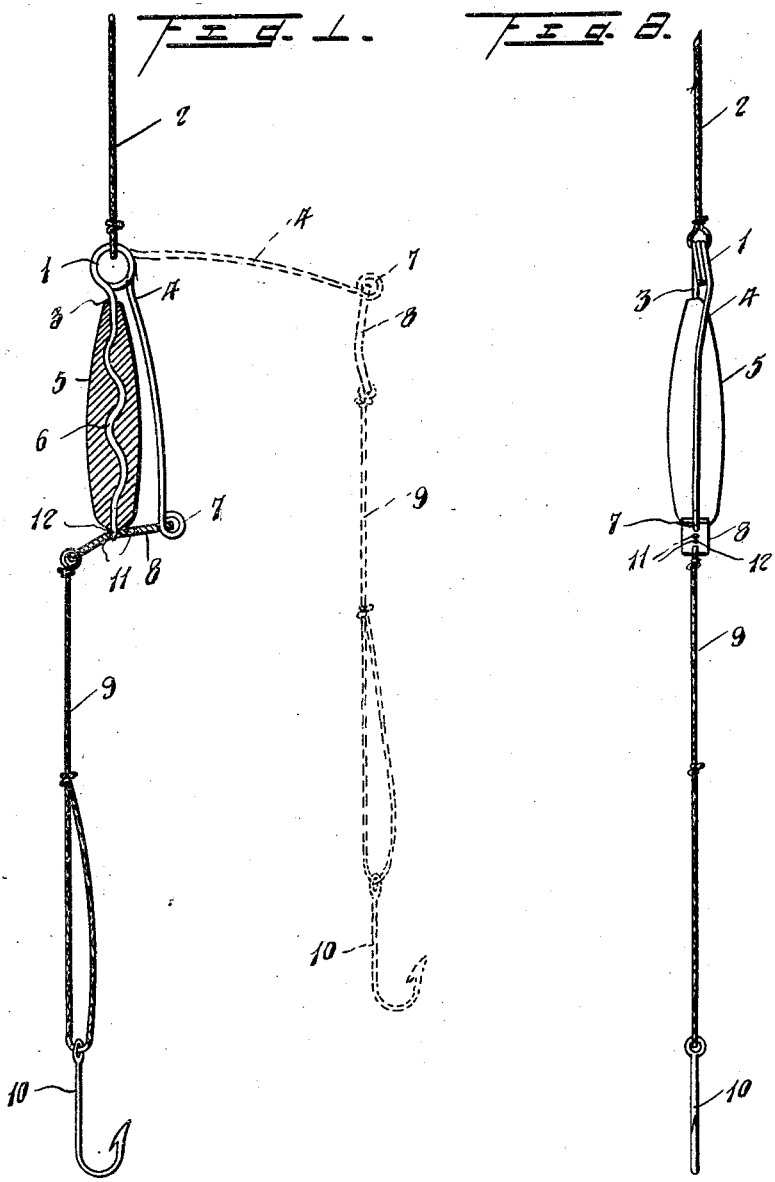
Inventor
F. H. McCall,
By [signature]
Attorney

UNITED STATES PATENT OFFICE

FURMAN H. McCALL, OF ANDERSON, SOUTH CAROLINA, ASSIGNOR OF ONE-HALF TO CARL C. McCALL, OF GREENVILLE, SOUTH CAROLINA

FISHING LINE

Application filed November 14, 1928. Serial No. 319,291.

The invention relates to fishing lines and has for its object the provision of means adapted to be connected to a fishing line whereby when the hook is taken by a fish the hook is given an upward jerk to securely snag the fish.

A further object of the invention is the provision of an appliance adapted to be secured to a fishing line comprising a member having spring arms that are stressed to move from one another, one of said arms having a sinker secured thereon, and the other of said arms having a link provided with means to engage the end of the arm on which the sinker is mounted, said link having the end of the line secured thereto, the anchor holding the fishing line end inert when the hook is struck by a fish, the link being released from the end of the arm on which the sinker is secured to release the other arm to the action of the spring to give a slight upward jerk to the hook to securely snag the fish.

The invention will be described in detail hereinafter and will be found illustrated in the accompanying drawings in which Figure 1 is a view of the lower fragment of a fishing line showing the device in full lines in operative position, the link shown in longitudinal section and showing the position of the device when the link is released in broken lines, and Figure 2 is a view of the parts shown in Figure 1 in a position at right angles to the position of Figure 1.

In the drawings similar reference characters are used to designate corresponding parts in both of the views.

The fishing appliance comprises a member including a spring coil 1 adapted to be secured to the end of a fishing line 2 and having the ends of the coil 1 extended to form arms 3 and 4. Mounted on the arm 3 is a sinker 5 and said arm is provided with curved or bent portions 6 to securely hold the sinker 5 thereon. The end of the arm 4 is provided with an eye 7 and 8 indicates a link pivotally mounted in the eye 7 to which the hook end 9 of the fishing line is secured at the free end thereof, the hook being designated 10. Link 8 is provided with one or more openings 11 to receive the end 12 of the arm 3 and to hold the arms 3 and 4 under tension. When using the device the parts are arranged as shown in full lines in Figure 1 when the line is dropped into the water and the hook 10 baited. When a fish takes the bait on the hook 10 so as to give a pull on the line 9, no matter how slight, the end 12 of the arm 3 will be released from the opening 11 in the link 8 in which it may be inserted, and the reaction of the coil spring 1 will move the arm 4 upwardly with relation to the arm 3 as shown in broken lines in Figure 1 thus giving a sufficient jerk to the hook 10 to securely snag the fish without tearing the hook from the mouth of the fish, the sinker 5 on the arm 3 serving to hold the arm 3 temporarily inert to impart the full tension of the coil 1 to the arm 4 for the purpose stated.

What is claimed is:—

A fishing line appliance, comprising a coiled loop of spring wire adapted to be secured to a fishing line, the ends of the wire forming said loop being extended therefrom and normally spaced from one another, one of said wire ends being provided with bends, a sinker secured to the last mentioned wire end and held thereon by said bends, a link pivotally secured to the other wire end and having an opening therein to engage the extremity of the first wire end, and a fish hook supported on the free end of the link, said link being releasable from the wire end engaged in said opening when the fish hook is pulled releasing the wire ends to permit them to resume spaced relation, the sinker holding the end on which it is secured temporarily inert whereby the other end moves upwardly to impart an upward jerk to the hook.

In testimony whereof I affix my signature.

FURMAN H. McCALL.